Sept. 1, 1964     J. L. COONEY     3,146,490
CALENDERING APPARATUS
Filed Dec. 14, 1960

INVENTOR
JOHN LEO COONEY

BY *Carl A. Hechmer*

ATTORNEY

United States Patent Office 3,146,490
Patented Sept. 1, 1964

3,146,490
CALENDERING APPARATUS
John Leo Cooney, Wilmington, Del., assignor to E. I. du Pont de Nemours and Company, Wilmington, Del., a corporation of Delaware
Filed Dec. 14, 1960, Ser. No. 75,745
1 Claim. (Cl. 18—2)

This invention relates to an improved calendering apparatus used in the calendering of synthetic sheet-like fabrics.

Calendering, as it relates to the production of ordinary paper products produced from cellulose fibers, can involve the passage of the newly formed paper sheeting between rolls to impart strength among other physical properties. Hot calendering, i.e., passage of the sheet between two or a series of rollers some or all of which are heated, is employed to increase such properties of a synthetic sheet-like fabric as tensile and tear strength, abrasion resistance and tenacity. However, it has been found that in passing sheets of synthetic structure between heated metal calender rollers, parts of the synthetic structure may adhere to the heated metal calender roller. In some instances, a doctor blade, i.e., a sharp elongated blade-like structure positioned adjacent to the heated metal roller, is provided to scrape the synthetic material from the metal roller to avoid the inclusion of this material into the sheet itself since such material would produce clots or clumps and result in a heterogeneous surface being produced on the synthetic sheet-like fabric. The metal doctor blade, after a short period of time, develops an uneven or minutely jagged surface which gouges and furrows the metal roller. This in turn produces a non-smooth surface on the surface of the synthetic sheet-like structure. Also, when the doctor blade develops ridges on its cutting edge, some material adhering to the roll is not removed and is fused into the synthetic structure to produce inclusions in its surface. Of course, the same results appear when the roller itself has been gouged and pitted. As a direct result of the adhesion of the synthetic material to the heated metallic calender roll and the present inability to effectively remove material which adheres to the calender roll, commercial production of calendered synthetic structure has been seriously hampered.

It is, therefore, an object of the present invention to provide a calendering apparatus which will enhance commercial production of hot calendered synthetic sheet-like structure. It is a further object to substantially reduce the adhesion of the synthetic structure to heated rolls over which the structure must pass, and to provide an effective means for removing any small amounts of material which might adhere to the roll without marring the surface of the roll. It is a further object to provide and maintain a coating on the surface of the hard roll that will resist adhesion. Other objects will become apparent from the following descriptions, drawings and the claims.

The term "synthetic sheet-like structure" is intended to designate a synthetic polymeric structure synthesized by man as distinguished from a polymeric product of nature or a derivative thereof.

The term "TFE-fluorocarbon resin" is the generic name for a synthetic polymeric resin containing essentially polytetrafluoroethylene, also known by the trade name "Teflon" (registered trademark for Du Pont's TFE-fluorocarbon fiber or resin), and is described in Example 3 of United States Patent 2,400,099. This resin is also described in chapter 4, pages 59–63, 75–87 and 92–94, M. A. Rudner, "Fluorocarbons," Reinhold Publishing Corporation, New York, 1958.

The term "doctor blade," as used herein, is meant to describe an elongated structure provided with a surface for area contact against a roller. The blade of this invention is without a sharp pointed cutting surface solely directed to the point of contact on the roll. The contact surface of the blade should be of such design to allow both scraping and deposition as described in succeeding pages.

In accordance with the present invention, there is provided an apparatus comprising an elongated, hard-surfaced, rotatably mounted cylindrical roller substantially uniformly surface coated with TFE-fluorocarbon resin and a bar of TFE-fluorocarbon resin, said bar being mounted under pressure into engagement along its longitudinal surface with the cylindrical surface of said roller.

In terms of a calendering apparatus for the hot calendering of synthetic sheet-like structure, the hard-surfaced roll is heated and maintained at a temperature above the melting point of the synthetic structure being calendered. The operating range of temperature at which the hard calender roll should be maintained is generally between about 180 and about 250° C. but this, of course, would depend on the synthetic material being calendered. The TFE-fluorocarbon resin on the heated hard roll should be of at least about 0.1 mil in thickness to obtain the desired results; however, it has been found that the most desirable results are obtained when the thickness of the coating is between about 0.5 to about 2.0 mils. The hard roll may be composed of any material sufficient to withstand physical and/or chemical degradation at the operating temperatures described above. It has been found that a metal roller is preferred in actual operation because the surface of the roll is more easily maintained and because the heat transfer of metal is better than most hard materials.

The doctor blade may have the dual purpose of scraping or abrading the coated surface of the hard roll, thermoplastically smoothing the coated surface and of depositing material to maintain a fresh monomolecular layer on the roll surface. Where a smooth surface is desired, the contact geometry of the doctor blade on the hard roll is an area contact rather than sharp or pointed since a sharp edge would be vulnerable to the development of an uneven surface due to the composition and configuration of the blade itself. The blade would also become softened along its contact surface with the heated hard roller and could, therefore, develop portions along its longitudinal contact surface which were jagged and would thus destroy over-all continuity of contact with the roller and evenness of deposition. The point must be made that the doctor blade is not herein used primarily for scraping the surface of the hard roll, which would tend to mar the resinous coating on the roll, so it is not required, nor in fact, is it desired, that a sharp edge be maintained solely in cutting engagement with the hard-calender roll.

The doctor blade of TFE-fluorocarbon resin is blunted at its contact surface to eliminate the striations and tearings on the surface coating of the hard roll which would otherwise develop in operation. The blade will develop a concave contact surface to conform with the rotating surface of the hard roll. The extremities of the doctor blade along the contact surface will naturally have, or develop, an abrupt edge to remove material which may adhere to the coated surface of the hard roll; however, the major surface of blade contact on the roll will initially, or through use, conform to the rotating surface of the hard roll and will perform a polishing action which will maintain a smooth surface on the coated hard roll and which is conducive to deposition.

The term "soft roll" is meant to designate the calender roll paired with the heated metal roll and in contiguous cylindrical relationship thereto. Such soft rolls can be of a fibrous composition, or linen, an elastomer, synthetic resin, or the like. If a fibrous or porous roll surface is used, it may advantageously be coated or impregnated with a release-promoting material such as a silicone resin or fluid, or other equivalent material. The roll can also be of a suitable metal and may be covered with any of the above-indicated or other similar materials. It is intended that the roll should be of a softer composition than the hard-surfaced roll so that, when sheeting is passed between the two rolls, better contact and uniform pressing will occur than would be obtained if both rolls were hard surfaced. Optionally a doctor blade of the type described herein may also be employed in contact with the soft roll as well as with the hard roll. This soft roll can be of metal and covered with cardboard or other like material and is designed to be of softer material than the hard-surfaced roller so that, when sheeting is passed between the two rolls, some pressing will occur but not the extreme press which would occur if both rolls were hard surfaced.

The invention will be more readily understood by reference to the drawings.

Figure 1:
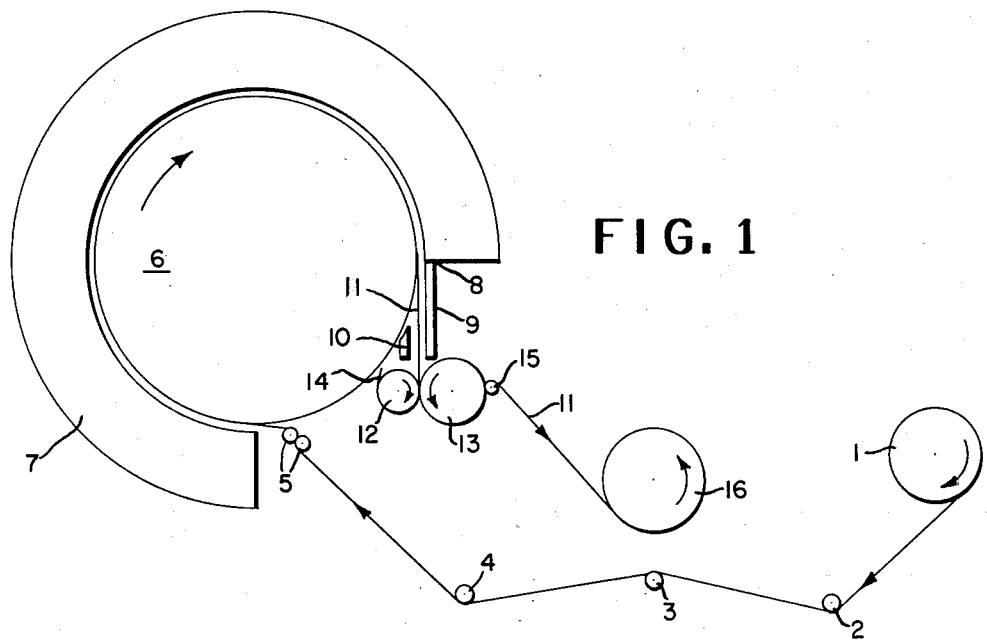
FIGURE 1 illustrates diagrammatically a calendering apparatus for hot calendering a synthetic sheet-like fabric, the principal parts of which are discussed in detail hereinafter.
Figure 3:
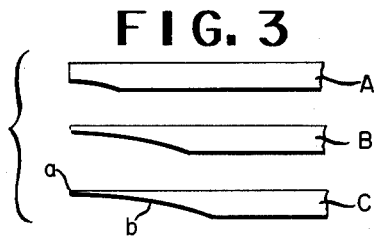

FIGURE 3 diagrammatically depicts the progressive stages of blade tip shape of the doctor blade 14 of FIGURE 1.

Figure 2:
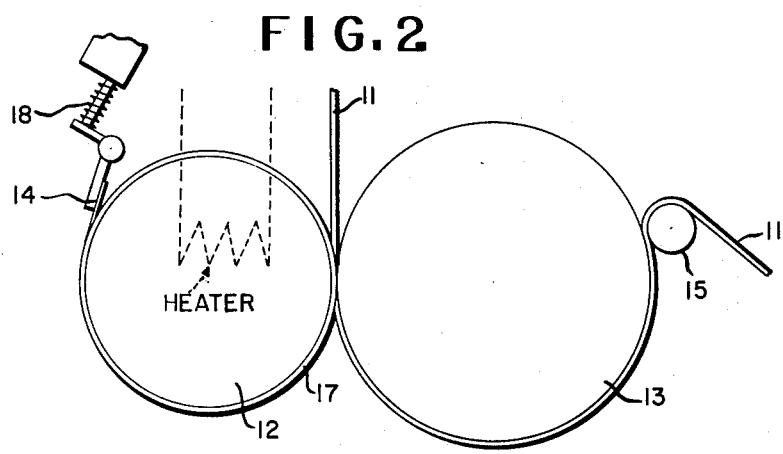
FIGURE 2 is a diagrammatic representation of the doctor blade 14 in contiguous longitudinal relationship with the heated metallic calender roll 12 which is shown in FIGURE 1.

A typical apparatus wherein hot calendering of synthetic sheet-like structure is effected is illustrated in FIGURES 1 and 2. As mentioned previously, FIGURE 1 is a diagrammatic illustration of a typical calendering process for hot calendering a synthetic sheet-like structure which shows a supply of synthetic sheet-like structure 1 being fed over feed rolls 2, 3, 4 and 5 to a cylindrical heated metal drum 6 which is rotating in a clockwise direction. The heated drum is surrounded almost entirely by the hot air duct 7 to a position 8 where infrared heaters 9 and 10 further heat the synthetic sheet-like structure 11 just prior to its passage between the coated heated metal roll 12 coated with TFE-fluorocarbon resin and the unheated soft roll 13. The heated metal roller 12 is shown to be rotating in a clockwise direction while the unheated soft roll 13 is shown to be rotating in a counterclockwise direction. The doctor blade 14 is positioned under pressure to polish and scrape the surface of the heated metal roller 12. After passage of the synthetic sheet-like fabric between the two rollers 12 and 13 the fabric 11 passes half around the soft roll 13 to feed roll 15 to the windup roller 16 which is shown to be rotating in a counterclockwise direction.

FIGURE 2 is a diagrammatic representation of the doctor blade 14 in contiguous relationship with the metal roll 12. The coating 17 of TFE-fluorocarbon resin on the metal roll is shown to be scraped by the doctor blade 14 which is composed of TFE-fluorocarbon resin and is pivotally held under pressure by the loading spring 18 in contact with the coated surface 17 of the metal roller 12. Contact betweeen the doctor blade and the hard roll may be either continuous or intermittent but should be in excess of 10% of the total time cycle. The precise pressure of engagement is not critical and may be readily determined. The synthetic sheet-like fabric 11 passes simultaneously between the metal and soft rolls 12 and 13 to the feed roll 15 and onto windup.

FIGURE 3 is a diagrammatic representation showing the progressive stages of blade tip shape of the TFE-fluorocarbon resin doctor blades and illustrates an initial blunted blade A through blade B, which depicts the shape of the contact surface after some use, to blade C, which depicts the blade after considerable use. It is important to note that while the tip of blade C is pointed, the point is not, in actual operation, positioned so that its apex $a$ is directed to be the sole contact on the coated surface of the metal roll but is positioned so that the contact is made along the blunt surface $b$.

This invention is directed primarily toward an apparatus for use in the calendering of synthetic sheet-like structure. The heated calendering roll is uniformly coated with TFE-fluorocarbon resin to a thickness which is as thin as possible to effect good heat transfer yet thick enough to produce effective wear. The preferred range of thickness is from about 1 to about 2 mils. A thickness of below about 0.5 mil does not appear to consistently produce the desired results for the reason that the wearability of the coating is jeopardized, while, as the thickness increases from about 2 mils, it will be less effective as the thickness rises for the heat transfer from the roller through the coating to the outer surface of the coating will naturally decrease with thickness.

The doctor blade may be composed entirely of TFE-fluorocarbon resin and has a dual purpose in its pressured contact with the heated metal roller. The doctor blade is, immediately along the point of contact, in a plastic or molten state due to the heat of the roller. It, therefore, acts to deposit a repeatedly renewed layer of "Teflon" on the surface of the roller. This is accomplished primarily, as stated, by the deposition of a fresh layer by the doctor blade; however, the doctor blade also polishes the top layer of the coated roll surface and, otherwise, removes imperfections on the surface of the roll. It is very important that the heated roller maintain a smooth surface to produce a desired corresponding smooth surface on the calendered synthetic fabric pressed against it, as well as to maintain continuity of calendering operation.

It is important to note that a combination whereby the heated calender roll is coated with TFE-fluorocarbon resin and the doctor blade is composed of metal, or of some equally hard material, is not desirable for the reason that, even if blunted, the blade would scrape the coating from the calendering roll and would, of course, not deposit additional resinous material on the roll to maintain the thickness of the coating and to fill or polish any pits or striations on the surface of the roller. The smooth surface which is so important with regard to the calender roll in the production of a resulting smooth surface synthetic sheet-like structure is, therefore, not maintained.

The combination of a non-coated metal calendering roll to a roll of some equal hard material and a doctor blade composed entirely of TFE-fluorocarbon resin is also not effective since there would neither be uniform deposition on the roll nor would there be sufficient continuous thickness over the surface of the roller to produce the desired results. In that case, parts of the synthetic fabric would adhere to the steel roll and while some deposition from the resinous doctor blade would occur it would be uneven and would not result in a homogeneous surface either on the roller or on the calendered synthetic sheet-like fabric.

While the resinous doctor blades, herein described, have been of TFE-fluorocarbon resin, this invention is not meant to be limited thereto since other synthetic resins, i.e., polyamides and polyesters, will exhibit similar results; however, the deposition experienced by use of the blade of TFE-fluorocarbon resin is probably unique to it alone.

It is well known that polytetrafluoroethylene exhibits very unusual properties. Structures composed of polytetrafluoroethylene do not exhibit any known tendency to adhere to other materials and, in fact, generally resist conventional attempts to produce adhesion. Such structures have excellent strength properties and exhibit excellent resistance to chemical attack. The use of such a material, does then, perform a valuable function in substantially eliminating adhesion in calendering and thus allows the hot calendering of synthetic sheet-like structure, which has been hampered in attempted commercial production due to the adhesion problems discussed earlier.

This invention permits the commercial production of calendered synthetic sheet-like structures which has been seriously hampered in the past due to the adhering of synthetic materials to the heated calendered rollers; therefore, it is now, by virtue of this invention, possible to commercially hot calender synthetic sheet-like fabric, and to obtain smooth surfaced structures having greatly improved properties of tensile strength, tear strength and abrasion resistance plus greater density over the uncalendered product.

This invention is applicable to the hot calendering of wholly synthetic sheet-like structures as well as to sheet-like structures consisting of a mixture or mixtures of synthetic and non-synthetic fibers. It is designed to eliminate adhesion of synthetic material to the heated calender rollers and this would naturally be present to a lesser extent with fabric whose total compositions would contain a mixture or mixtures of synthetic and non-synthetic materials. It is also very applicable to the hot calendering of fibrid bonded synthetic fiber papers, as disclosed in copending United States patent application Serial No. 788,371, now Patent No. 2,999,788, since calendering is required to obtain maximum physical properties and since most end uses of this product requires utilization of maximum strength.

This invention is especially applicable to resin impregnated structures where the purpose in calendering is to melt the binder or filler. The calendering operation is generally performed at a temperature above the melting point of the binder or filler so that it becomes softened and even molten in some cases. This binding or filler material would then adhere to the surface of the hard roll. This has been eliminated due to this invention and successful calendering is now a readily achieved reality.

Many equivalent modifications will be apparent to those skilled in the art from a reading of the above without a departure from the inventive concept.

What is claimed is:

An improved calendering apparatus for compacting non-woven webs formed of filaments of synthetic organic polymeric compositions, said apparatus comprising an elongated, hard-surfaced, rotatably mounted heated cylindrical roller having an initial uniform coating between about 0.1 mil and about 2.0 mils thickness of TFE-fluorocarbon resin on its cylindrical surface, a soft-surfaced cylindrical roller rotatably mounted and aligned parallel to and in tangential longitudinal pressure engagement with said hard-surfaced roller, and at least one TFE-fluorocarbon resin roll surface coating and polishing element having an elongated planar surface, said coating element mounted in pressure engagement with the surface of the coated hard-surfaced roller during at least 10% of any given operating period so that said planar surface lies in lateral substantially tangential engagement over a single uninterrupted area of contact against the coated hard-surfaced roller, the heated roller operatively associated with a heating means for maintaining the heated roller at a temperature between about 180° to about 250° C.; the temperature of the heated roller and the frictional effects between the heated roller and the coating element being such that material of said element in the area of contact of the planar surface of the said element with the heated roller is maintained in a sufficiently plastic state to deposit an additional continuous thin layer of the TFE-fluorocarbon material on the heated roller surface and maintain said additional layer in smooth, polished condition to minimize sticking of the filaments to the heated roller.

References Cited in the file of this patent
UNITED STATES PATENTS

| | | |
|---|---|---|
| 2,754,796 | Faulkner et al. | July 17, 1956 |
| 2,874,674 | Hornbostel | Feb. 24, 1959 |
| 2,917,781 | Petry | Dec. 22, 1959 |
| 2,924,184 | Welch | Feb. 9, 1960 |

OTHER REFERENCES

Industrial and Engineering Chemistry, September 1946, pages 871–877.